(12) United States Patent
Jamal

(10) Patent No.: US 11,605,968 B2
(45) Date of Patent: Mar. 14, 2023

(54) CHARGING DEVICE FOR CHARGING A SUPERCAPACITOR

(71) Applicant: Pliops Ltd., Tel Aviv (IL)

(72) Inventor: Naseem Jamal, Tel Aviv (IL)

(73) Assignee: PLIOPS LTD., Tel Aviv (IL)

( * ) Notice: Subject to any disclaimer, the term of this patent is extended or adjusted under 35 U.S.C. 154(b) by 60 days.

(21) Appl. No.: 17/301,224

(22) Filed: Mar. 29, 2021

(65) Prior Publication Data

US 2022/0311268 A1    Sep. 29, 2022

(51) Int. Cl.
  *H02J 7/34* (2006.01)
  *H02J 7/00* (2006.01)

(52) U.S. Cl.
  CPC .......... *H02J 7/345* (2013.01); *H02J 7/00712* (2020.01); *H02J 2207/20* (2020.01); *H02J 2207/50* (2020.01)

(58) Field of Classification Search
  CPC .... H02J 7/345; H02J 7/00712; H02J 2207/20; H02J 2207/50
  See application file for complete search history.

(56) References Cited

U.S. PATENT DOCUMENTS

| | | | |
|---|---|---|---|
| 2007/0269168 A1* | 11/2007 | Park | G09G 3/3208 385/92 |
| 2017/0063106 A1* | 3/2017 | Armstrong | H02J 7/0077 |
| 2017/0205862 A1* | 7/2017 | Gofman | G06F 13/426 |
| 2020/0008281 A1* | 1/2020 | Krick | H05B 45/60 |
| 2020/0055472 A1* | 2/2020 | Kageyama | H02J 7/005 |
| 2020/0229278 A1* | 7/2020 | Gommans | H05B 45/54 |

\* cited by examiner

*Primary Examiner* — Richard Isla
*Assistant Examiner* — Johali A Torres Ruiz
(74) *Attorney, Agent, or Firm* — Reches Patents

(57) ABSTRACT

A charging device that includes (a) a DC to DC converter ("converter") that includes a converter control input and a converter output for outputting a charging voltage to the supercapacitor, (b) an adjustable voltage divider, (c) a controller that is configured to (i) sense a supercapacitor voltage, (ii) determine a first target value of the supercapacitor voltage, based on an internal impedance of the supercapacitor and on a nominal supercapacitor voltage that is lower than the first target value of the supercapacitor voltage, and (iii) during a first phase of a charging process, output a control signal via the control output and to the converter control input, to set the charging voltage to one or more values that once provided to the supercapacitor cause the supercapacitor voltage to reach, at the end of the first phase of the charging process, the first target value of the supercapacitor voltage.

18 Claims, 3 Drawing Sheets

CHARGING DEVICE FOR CHARGING A SUPERCAPACITOR

BACKGROUND

Super capacitors are used to supply power to various electrical components of various electronic systems, such as but not limited to storage systems.

Super capacitors can be charged by charging device that use feedback from the supercapacitor and try to set the supercapacitor voltage to a nominal supercapacitor voltage which is the voltage that should supplied by the supercapacitor to the various electrical components.

Using such feedback dramatically lengthens the charging period—as it does not take into account the internal voltage drop of the supercapacitor—resulting from the internal impedance of the supercapacitor.

Due to the internal voltage drop of the supercapacitor, the feedback shows that the supercapacitor voltage reaches the nominal supercapacitor voltage—while part of that supercapacitor voltage "falls" on the internal voltage drop.

This feedback error dramatically reduces the efficiency of charging process.

There is a growing need to provide an efficient charging device and a method for efficiently charging a supercapacitor.

SUMMARY

A charging device for charging a supercapacitor.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
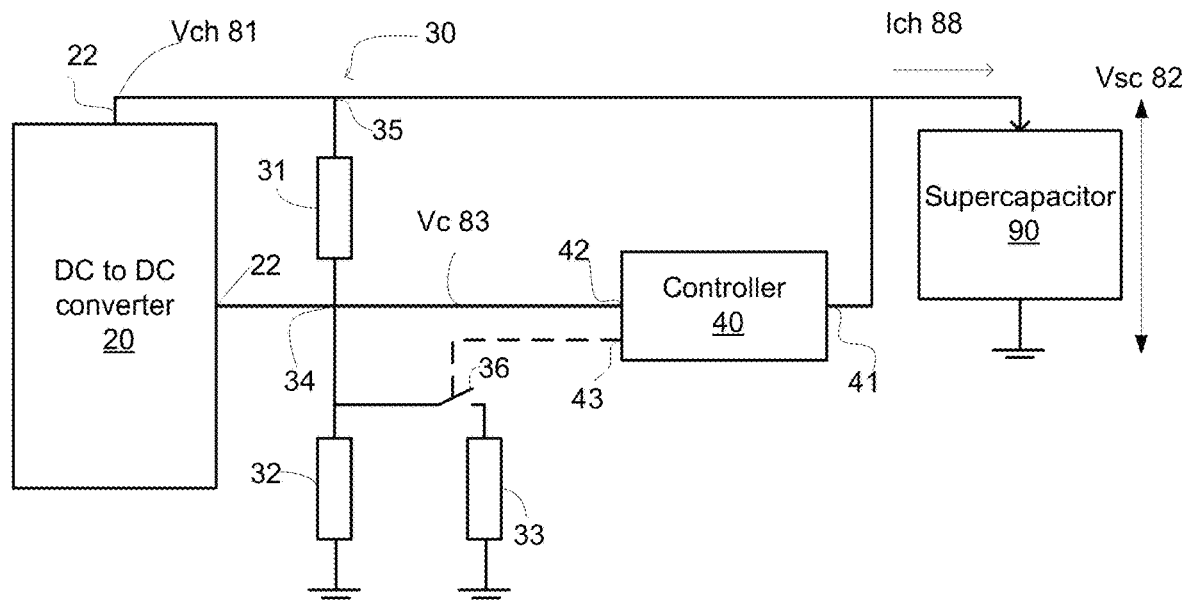
FIG. 1 illustrates an example of a charging device and a supercapacitor.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a device capable of executing the method and/or to a device manufactured by the method.

Any reference in the specification to a device should be applied mutatis mutandis to a method that may be executed by the device, and/or may be applied mutatis mutandis to method for manufacturing the device.

Any combination of any module or unit listed in any of the figures, any part of the specification and/or any claims may be provided.

Any combination of any steps of any method illustrated in the specification and/or drawings may be provided.

Any combination of any subject matter of any of claims may be provided.

Any combinations of systems, units, components, illustrated in the specification and/or drawings may be provided.

Any value (width, form factor, distance, number of supercapacitors, temperature, capacitance, diameter, length, power capacity) mentioned in the application may be replaced by another value.

FIG. 1 illustrates an example of a charging device 10 and a supercapacitor 90.

The charging device 10 is configured to charge a supercapacitor, and may include a converter 20 that is a DC to DC converter, an adjustable voltage divider 30, and a controller 40.

The converter 20 includes a converter control input 21 and a converter output 22. The converter output 22 is configured to output a charging voltage (Vch 81) and/or a charging current (Ich 88) to the supercapacitor 90.

The adjustable voltage divider 30 includes first resistor 31, second resistor 32, third resistor 33, intermediate node 34, and voltage divider input port 35 that is electrically coupled to the converter output 22. The first resistor 31 is connected between the voltage divider input port 35 and the intermediate node 34. The second resistor 32 is connected between the intermediate node 34 and the ground.

The third resistor 33 is selectively connected in parallel to the second resistor 32. The selectively connectivity may be obtained by a switch 36 that may be open or closed under the control of the controller 40.

The controller 40 may include sense input 41, control output 42 and an additional control output 43. The control output 42 is electrically coupled to the converter control input 21 and to the intermediate node 34.

The controller 40 is configured to (a) sense a supercapacitor voltage (Vsc 82), using the sense input 41, (b) determine a first target value of the supercapacitor voltage, based on an internal impedance of the supercapacitor and on a nominal supercapacitor voltage, wherein the first target value of the supercapacitor voltage exceeds the nominal supercapacitor voltage, (c) during a first phase of a charging process, output a control signal (Vc 83) via the control output 42 and to the converter control input 21, to set the charging voltage to one or more values that once provided to the supercapacitor cause the supercapacitor voltage to reach, at the end of the first phase of the charging process, the first target value of the supercapacitor voltage.

The first target value of the supercapacitor voltage may set to compensate for the internal voltage drop of the supercapacitor. For example—the first target value of the supercapacitor voltage may be a sum of the internal voltage drop and the nominal supercapacitor voltage—or may even exceed this sum.

Once the first phase of a charging process ends, a second phase of the charging process starts and a second target value of the supercapacitor voltage may be set. The second target value of the supercapacitor voltage may substantially equal the nominal supercapacitor voltage. During the second phase of the charging process the charging device may attempt to set the supercapacitor voltage to the second target value of the supercapacitor voltage.

The controller 40 is configured to enter a high impedance state and not output any control signal, during a second phase of the charging process that follows the first phase of the charging process. The second phase may be a steady state phase in which the supercapacitor voltage should remain substantially unchanged- and be equal to the nominal supercapacitor voltage.

The additional control output 43 may be used for setting (a) a first impedance value of the adjustable voltage divider 30 during the first phase of the charging process, and (b) a second impedance value of the adjustable voltage divider 40 during the second phase of the charging process, wherein the first impedance value differs from the second impedance value.

The additional control output 43 may be used for (a) connecting the third resistor in parallel to the second resistor during the first phase of the charging process, and (b) disconnecting the third resistor from the second resistor during a second phase of the charging process, the second phase of the charging process follows the first phase of the charging process.

The charging circuit 10 will, using the controlling scheme mentioned above, charge the supercapacitor with a first constant current during the first phase of the charging process.

It should be noted that the number of resistors of the adjustable voltage divider may exceed two, that the connectivity of the controller and/or the converter to the adjustable voltage divider may differ from those illustrated in FIG. 1, that any other type of adjustable voltage divider can be provided.

Figure 2:
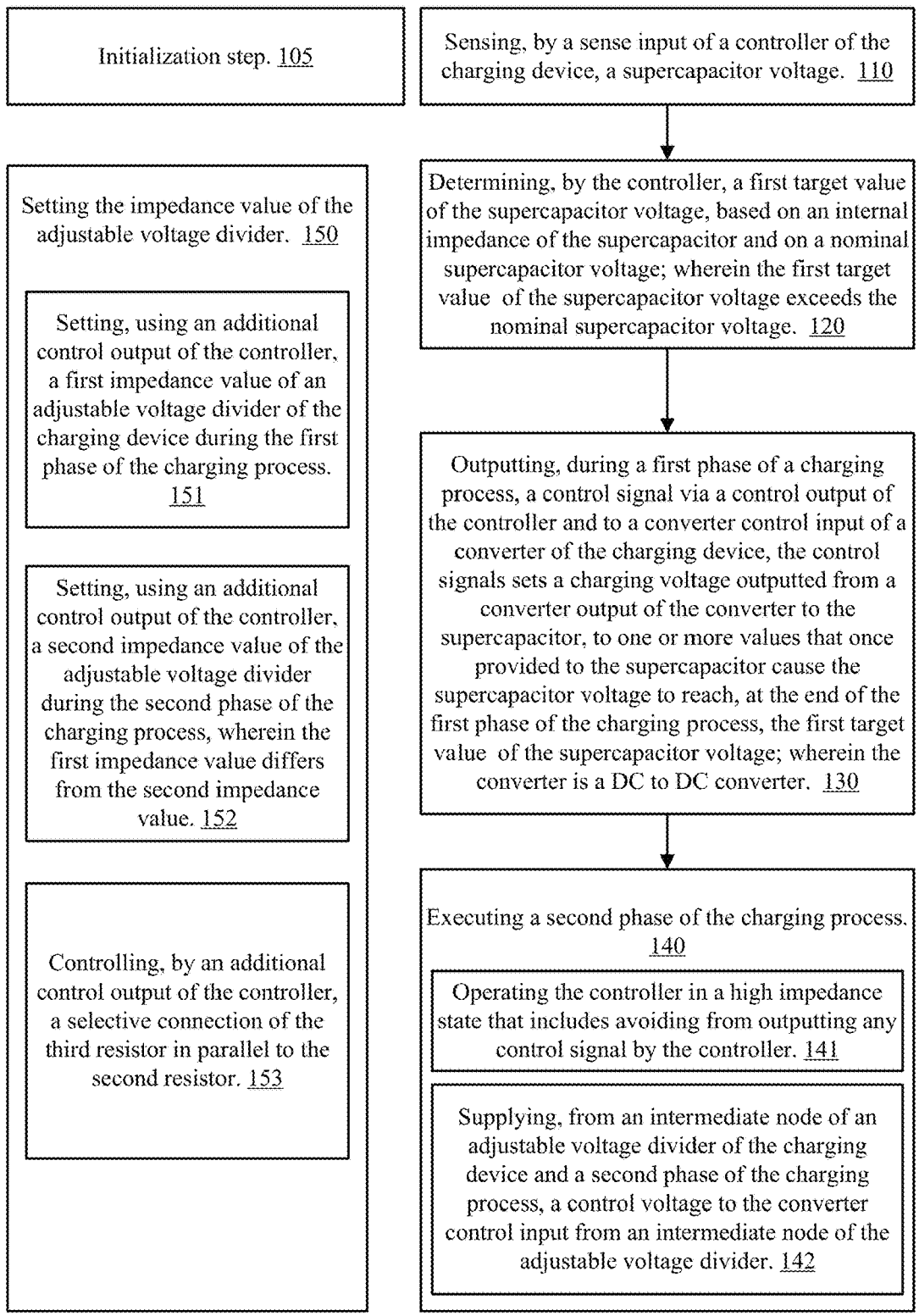
FIG. 2 illustrates an example of a method.

FIG. 2 illustrates an example of method 100.

Method 100 is for charging a supercapacitor by a charging device.

Method 100 may include an initialization step 105. The initialization step may include obtaining the internal impedance of the supercapacitor. Step 105 may also include obtaining the capacitance of the supercapacitor. The obtaining may include measuring or receiving.

Method 100 may include step 110 of sensing, by a sense input of a controller of the charging device, a supercapacitor voltage.

Step 110 may be followed by step 120 of determining, by the controller, a first target value of the supercapacitor voltage, based on an internal impedance of the supercapacitor and on a nominal supercapacitor voltage; wherein the first target value of the supercapacitor voltage exceeds the nominal supercapacitor voltage.

Step 120 may be followed by step 130 of outputting, during a first phase of a charging process, a control signal via a control output of the controller and to a converter control input of a converter of the charging device, the control signals sets a charging voltage outputted from a converter output of the converter to the supercapacitor, to one or more values that once provided to the supercapacitor cause the supercapacitor voltage to reach, at the end of the first phase of the charging process, the first target value of the supercapacitor voltage; wherein the converter is a DC to DC converter.

Step 110, 120 and 130 may be executed (one or multiple times) during the first phase of the charging process.

Steps 130 may be followed by step 140 of executing a second phase of the charging process.

Step 140 may include step 141 of operating the controller in a high impedance state that includes avoiding from outputting any control signal by the controller.

Step 140 may include step 142 of supplying, from an intermediate node of an adjustable voltage divider of the charging device and a second phase of the charging process, a control voltage to the converter control input from an intermediate node of the adjustable voltage divider, the second phase of the charging process follows the first phase of the charging process.

Method 100 may also include step 150 of setting the impedance value of the adjustable voltage divider. Step 150 may be executed during the first and second phases of the charging process.

Step 150 may include step 151 of setting, using an additional control output of the controller, a first impedance value of an adjustable voltage divider of the charging device during the first phase of the charging process.

Step 150 may include step 152 of setting, using an additional control output of the controller, a second impedance value of the adjustable voltage divider during the second phase of the charging process, wherein the first impedance value differs from the second impedance value.

Step 150 may include step 153 of controlling, by an additional control output of the controller, a selective connection of the third resistor in parallel to the second resistor.

Step 153 may include controlling of the selective connection of the third resistor by connecting the third resistor in parallel to the second resistor during the first phase of the charging process, and disconnecting the third resistor from the second resistor during a second phase of the charging process, the second phase of the charging process follows the first phase of the charging process.

Figure 3:
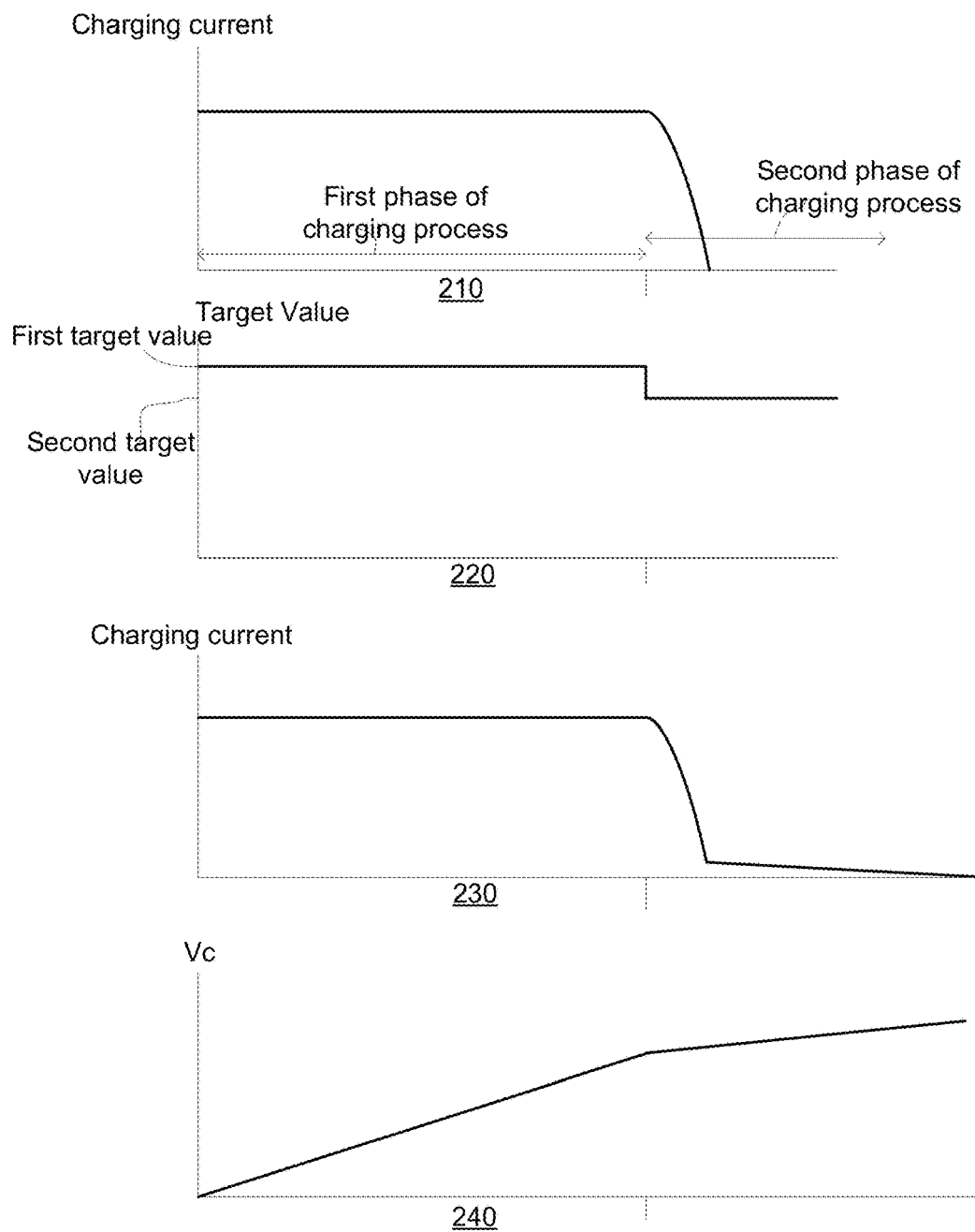
FIG. 3 illustrates examples of voltage and currents.

FIG. 3 illustrates examples of voltage and currents.

Curve 210 illustrates an example of a charging current of the charging device of FIG. 1.

Curve 220 illustrates examples of target values of the supercapacitor voltage of the charging device of FIG. 1.

Curve 230 illustrates an actual charging current of a prior art charging device.

Curve 240 illustrates an actual supercapacitor voltage of a supercapacitor of a prior art charging device.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention as claimed.

In the foregoing specification, the invention has been described with reference to specific examples of embodiments of the invention. It will, however, be evident that various modifications and changes may be made therein without departing from the broader spirit and scope of the invention as set forth in the appended claims.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Any reference to "consisting", "having" and/or "including" should be applied mutatis mutandis to "consisting" and/or "consisting essentially of".

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

It is appreciated that various features of the embodiments of the disclosure which are, for clarity, described in the contexts of separate embodiments may also be provided in combination in a single embodiment. Conversely, various features of the embodiments of the disclosure which are, for brevity, described in the context of a single embodiment may also be provided separately or in any suitable sub-combination.

It will be appreciated by persons skilled in the art that the embodiments of the disclosure are not limited by what has been particularly shown and described hereinabove. Rather the scope of the embodiments of the disclosure is defined by the appended claims and equivalents thereof.

What is claimed is:

1. A charging device for charging a supercapacitor, the charging device comprises:
    a converter that comprises a converter control input and a converter output, the converter output is configured to output a charging voltage to the supercapacitor; wherein the converter is a DC to DC converter;
    an adjustable voltage divider that comprises an intermediate node and a voltage divider output port that is electrically coupled to the converter output; wherein a control output is coupled to the intermediate node of the adjustable voltage divider;
    a controller that comprises a sense input and the control output;
    wherein the controller is configured to:
    (a) sense a supercapacitor voltage;
    (b) determine a first target value of the supercapacitor voltage, based on an internal impedance of the supercapacitor and on a nominal supercapacitor voltage; wherein the first target value of the supercapacitor voltage exceeds the nominal supercapacitor voltage; and
    (c) during a first phase of a charging process, output a control signal via the control output and to the converter control input, to set the charging voltage to one or more values that once provided to the supercapacitor cause the supercapacitor voltage to reach, at the end of the first phase of the charging process, the first target value of the supercapacitor voltage.

2. The charging device according to claim 1 wherein the controller is configured to enter a high impedance state and not output any control signal, during a second phase of the charging process that follows the first phase of the charging process.

3. The charging device according to claim 2 wherein the controller comprises an additional control output for setting (a) a first impedance value of the adjustable voltage divider during the first phase of the charging process, and (b) a second impedance value of the adjustable voltage divider during the second phase of the charging process, wherein the first impedance value differs from the second impedance value.

4. The charging device according to claim 1 wherein the adjustable voltage divider comprises a first resistor, a second resistor and a third resistor; wherein the second resistor is serially coupled, via the intermediate node, to the first resistor; wherein the first resistor is connected between the voltage divider input port and the intermediate node.

5. The charging device according to claim 4 wherein the controller comprises an additional control output that selectively connects the third resistor in parallel to the second resistor.

6. The charging device according to claim 4 wherein the controller comprises an additional control output that (a) connect the third resistor in parallel to the second resistor during the first phase of the charging process, and (b) disconnect the third resistor from the second resistor during a second phase of the charging process, the second phase of the charging process follows the first phase of the charging process.

7. The charging device according to claim 1 comprising the supercapacitor.

8. The charging device according to claim 1 wherein the adjustable voltage divider is adapted to supply a control voltage to the converter control input from the intermediate node of the adjustable voltage divider, during a second phase of the charging process, the second phase of the charging process follows the first phase of the charging process.

9. A method for charging a supercapacitor by a charging device, the method comprises:
sensing, by a sense input of a controller of the charging device, a supercapacitor voltage;
determining, by the controller, a first target value of the supercapacitor voltage, based on an internal impedance of the supercapacitor and on a nominal supercapacitor voltage; wherein the first target value of the supercapacitor voltage exceeds the nominal supercapacitor voltage; and
outputting, during a first phase of a charging process, a control signal via a control output of the controller and to a converter control input of a converter of the charging device, the control signals sets a charging voltage outputted from a converter output of the converter to the supercapacitor, to one or more values that once provided to the supercapacitor cause the supercapacitor voltage to reach, at the end of the first phase of the charging process, the first target value of the supercapacitor voltage; wherein the converter is a DC to DC converter;
wherein the charging device comprises an adjustable voltage divider, wherein the adjustable voltage divider comprises an intermediate node and a voltage divider output port that is electrically coupled to the converter output and wherein the control output is coupled to the intermediate node of the adjustable voltage divider.

10. The method according to claim 9 comprising operating the controller in a high impedance state that comprises avoiding from outputting any control signal by the controller, during a second phase of the charging process that follows the first phase of the charging process.

11. The method according to claim 10 comprising setting, using an additional control output of the controller, (a) a first impedance value of an adjustable voltage divider of the charging device during the first phase of the charging process, and (b) a second impedance value of the adjustable voltage divider during the second phase of the charging process, wherein the first impedance value differs from the second impedance value.

12. The method according to claim 9 comprising supplying, from the intermediate node of the adjustable voltage divider during a second phase of the charging process, the second phase of the charging process follows the first phase of the charging process.

13. The method according to claim 9 wherein the adjustable voltage divider comprises a first resistor, a second resistor and a third resistor; wherein the second resistor is serially coupled, via the intermediate node, to the first resistor; wherein the first resistor is connected between the voltage divider input port and the intermediate node; and wherein the method comprises controlling, by an additional control output of the controller, a selective connection of the third resistor in parallel to the second resistor.

14. The method according to claim 13 wherein the controlling of the selective connection of the third resistor comprises (a) connecting the third resistor in parallel to the second resistor during the first phase of the charging process, and (b) disconnecting the third resistor from the second resistor during a second phase of the charging process, the second phase of the charging process follows the first phase of the charging process.

15. A non-transitory computer readable medium for charging a supercapacitor by a charging device, the non-transitory computer readable medium stores instructions for:
sensing, by a sense input of a controller of the charging device, a supercapacitor voltage; determining, by the controller, a first target value of the supercapacitor voltage, based on an internal impedance of the supercapacitor and on a nominal supercapacitor voltage; wherein the first target value of the supercapacitor voltage exceeds the nominal supercapacitor voltage; and
outputting, during a first phase of a charging process, a control signal via a control output of the controller and to a converter control input of a converter of the charging device, the control signals sets a charging voltage outputted from a converter output of the converter to the supercapacitor, to one or more values that once provided to the supercapacitor cause the supercapacitor voltage to reach, at the end of the first phase of the charging process, the first target value of the supercapacitor voltage; wherein the converter is a DC to DC converter;
wherein the charging device comprises an adjustable voltage divider, wherein the adjustable voltage divider comprises an intermediate node and a voltage divider output port that is electrically coupled to the converter output and wherein the control output is coupled to the intermediate node of the adjustable voltage divider.

16. The non-transitory computer readable medium according to claim 15 wherein the control output is coupled to an intermediate node of an adjustable voltage divider of the charging device; wherein the non-transitory computer readable medium stores instructions for operating the controller in a high impedance state that comprises avoiding from outputting any control signal by the controller, during a second phase of the charging process that follows the first phase of the charging process.

17. The non-transitory computer readable medium according to claim 15 that stores instructions for setting, using an additional control output of the controller, (a) a first impedance value of an adjustable voltage divider of the charging device during the first phase of the charging process, and (b) a second impedance value of the adjustable voltage divider during the second phase of the charging process, wherein the first impedance value differs from the second impedance value.

18. The non-transitory computer readable medium according to claim 15 wherein the adjustable voltage divider comprises a first resistor, a second resistor and a third resistor; wherein the second resistor is serially coupled, via the intermediate node, to the first resistor; wherein the first resistor is connected between the voltage divider input port and the intermediate node; and wherein the wherein the non-transitory computer readable medium stores instructions for controlling, by an additional control output of the controller, a selective connection of the third resistor in parallel to the second resistor.

\* \* \* \* \*